(12) United States Patent  
Antens et al.

(10) Patent No.: US 8,668,759 B2  
(45) Date of Patent: Mar. 11, 2014

(54) SULPHUR-CONTAINING FERTILIZERS AND PROCESS FOR THE PREPARATION THEREOF

(75) Inventors: Jany Birgitta Maria Antens, Eindhoven (NL); Sunil Ashtekar, Bangalore (IN); Rafael Alberto Garcia Martinez, Calgary (CA); Reginald Lambert, Calgary (CA); Jason Trevor O'Brien, Queensland (AU); Marinus Johannes Reynhout, Amsterdam (NL); Guy Lode Magda Maria Verbist, Amsterdam (NL); John Woodruffe, Calgary (CA)

(73) Assignee: Shell Oil Company, Houston, TX (US)

( * ) Notice: Subject to any disclaimer, the term of this patent is extended or adjusted under 35 U.S.C. 154(b) by 268 days.

(21) Appl. No.: 13/146,425

(22) PCT Filed: Jan. 29, 2010

(86) PCT No.: PCT/EP2010/051046  
§ 371 (c)(1),  
(2), (4) Date: Aug. 29, 2011

(87) PCT Pub. No.: WO2010/086395  
PCT Pub. Date: Aug. 5, 2010

(65) Prior Publication Data  
US 2011/0302973 A1 Dec. 15, 2011

(30) Foreign Application Priority Data  
Jan. 29, 2009 (EP) .................................. 09151604

(51) Int. Cl.  
*C05B 7/00* (2006.01)  
*C05B 17/00* (2006.01)  
(52) U.S. Cl.  
USPC ................ 71/33; 71/34; 71/35; 71/48; 71/49; 71/64.03

(58) Field of Classification Search  
USPC ...................... 71/32–53, 64.03; 516/198–204  
See application file for complete search history.

(56) References Cited

U.S. PATENT DOCUMENTS

| 3,333,939 | A | 8/1967 | Davis et al. ........................ 71/29 |
| 3,926,841 | A | 12/1975 | Habasko et al. ............... 252/383 |

(Continued)

FOREIGN PATENT DOCUMENTS

| EP | 1560801 | 5/2004 | ............... C05B 7/00 |
| GB | 1312314 | 4/1971 | ............... C05G 3/00 |

(Continued)

OTHER PUBLICATIONS

Rothbaum, H.P., et al: Water-degradable sulphur/anhydrite pellets for fertilizer use, New Zealand Jrnl of Science, 1980, vol. 23: pp. 371-382.

*Primary Examiner* — Wayne Langel  
(74) *Attorney, Agent, or Firm* — Charles W. Stewart

(57) ABSTRACT

Process for the manufacture of sulphur-containing fertilizer compositions, comprising the steps of: a} providing a slurry of at least one phosphate-based fertilizer material selected from the group consisting of ammonium phosphates, ammonium phosphate based nitrogen-phosphorus-potassium (NPK) compounds, super phosphates and partially acidulated phosphate rocks; b) bringing said slurry into contact with at least one anionic surfactant and elemental sulphur; c) introducing the mixture obtained in step b} into a granulator unit in order to obtain granules of the fertilizer composition, wherein the at least one phosphate-based fertilizer material is present in an amount in the range of at least 50 wt. %, the elemental sulphur is present in an amount in the range of from 1 to 25 wt. % and the anionic surfactant is present in an amount in the range of from 0.001 to 3 wt. % based on the overall weight of the fertilizer composition. The present invention also provides a fertilizer composition.

10 Claims, 2 Drawing Sheets

Elemental sulphur ratios for the dryer cyclone, Examples 1-4.

(56) References Cited

U.S. PATENT DOCUMENTS

| | | | |
|---|---|---|---|
| 4,133,668 A * | 1/1979 | Young | 71/11 |
| 4,377,406 A | 3/1983 | Achorn et al. | 71/36 |
| 4,762,546 A | 8/1988 | Boles | 71/30 |
| 5,423,897 A | 6/1995 | Hudson et al. | 71/28 |
| 5,466,274 A * | 11/1995 | Hudson et al. | 71/28 |
| 5,571,303 A | 11/1996 | Bexton | 71/34 |
| 5,653,782 A | 8/1997 | Stern et al. | 71/53 |
| 5,753,731 A * | 5/1998 | Yoshioka et al. | 524/198 |
| 5,968,222 A * | 10/1999 | Kodali | 71/64.07 |
| 6,121,200 A * | 9/2000 | Berger et al. | 504/206 |
| 6,273,929 B1 * | 8/2001 | Hobbs | 71/64.03 |
| 7,416,678 B2 * | 8/2008 | Aratani | 252/8.61 |
| 7,521,482 B2 * | 4/2009 | Argillier et al. | 516/27 |
| 7,771,505 B2 * | 8/2010 | Ogle et al. | 71/28 |
| 2002/0139158 A1 | 10/2002 | Hunter | 71/35 |
| 2003/0172699 A1 * | 9/2003 | Phinney | 71/64.03 |
| 2004/0009878 A1 | 1/2004 | Lynch et al. | 504/367 |
| 2006/0178440 A1 * | 8/2006 | Blease | 516/77 |

FOREIGN PATENT DOCUMENTS

| | | | | |
|---|---|---|---|---|
| GB | 2292140 | | 2/1996 | C05D 9/00 |
| WO | WO9003350 | | 4/1990 | C05D 9/00 |
| WO | WO9716396 | | 5/1997 | C05G 3/00 |
| WO | WO02090295 | | 11/2002 | C05G 3/10 |
| WO | WO 03/037496 | * | 5/2003 | |
| WO | 2004/043878 | * | 5/2004 | |
| WO | WO2004043878 | | 5/2004 | C05B 7/00 |
| WO | WO2008024007 | | 2/2008 | |

* cited by examiner

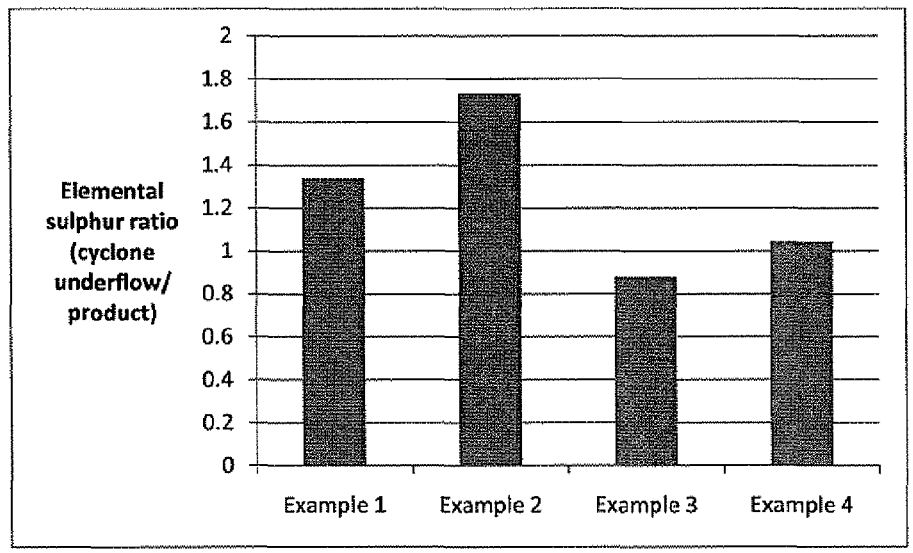
Figure 1 – Elemental sulphur ratios for the dryer cyclone, Examples 1-4.
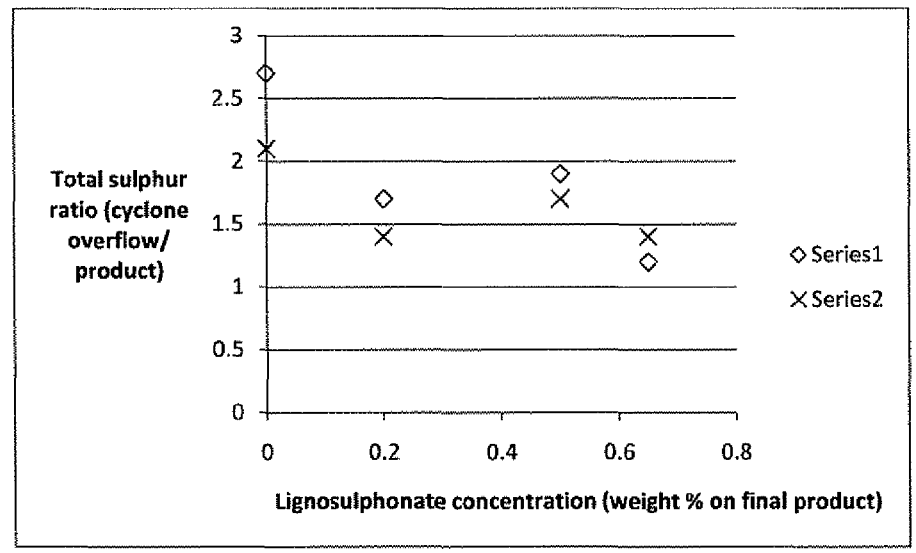
Figure 2 – Total sulphur ratios for the dryer (Series 1) and fugitive dust (Series 2) cyclone overflows for different lignosulphonate concentrations.

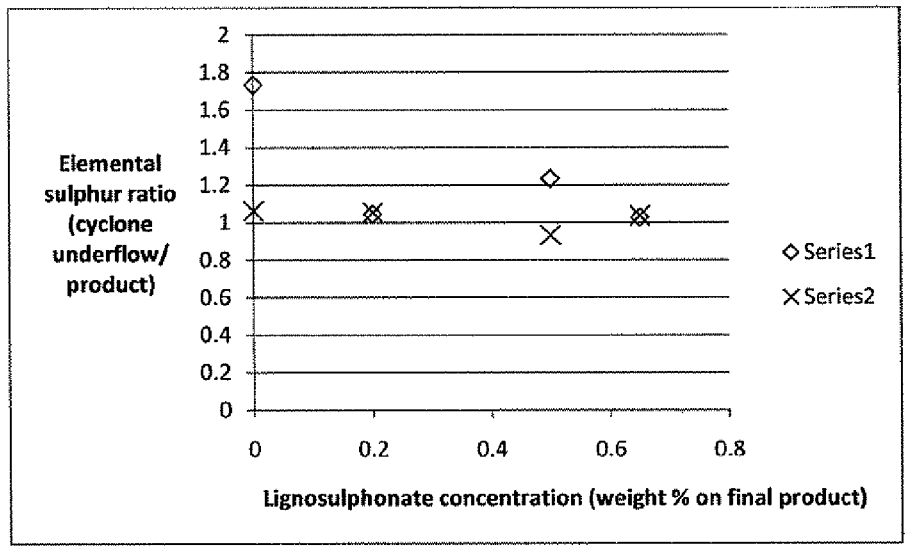
Figure 3 – Elemental sulphur ratios for the dryer (Series 1) and fugitive dust (Series 2) cyclone underflows for different lignosulphonate concentrations.
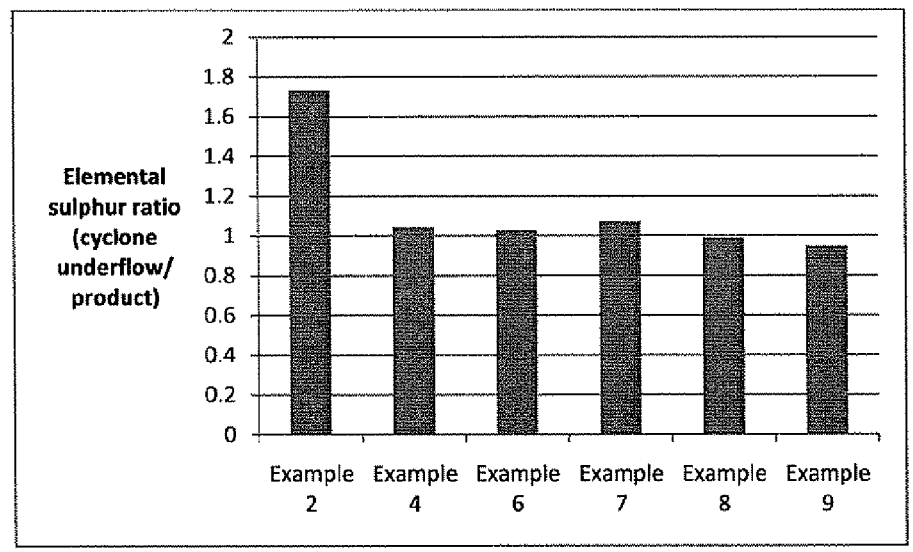
Figure 4 – Elemental sulphur ratios for the dryer cyclone underflows for different anionic surfactant species.

SULPHUR-CONTAINING FERTILIZERS AND PROCESS FOR THE PREPARATION THEREOF

PRIORITY CLAIM

The present application claims priority from PCT/EP2010/051046, filed 29 Jan. 2010, which claims priority from European Application 09151604.7, filed 29

FIELD OF THE INVENTION

The present invention relates to sulphur-containing fertilizers and a process for the preparation thereof.

BACKGROUND OF THE INVENTION

In the past a large amount of work has been devoted to the manufacture of sulphur-containing fertilizers. The growing worldwide demand for sulphur-containing fertilizers stems from the discovery that low crop yields in certain cases may be related to deficiencies in sulphur in the soil. An example of a species with high sulphur requirements is *Canola*. *Canola* is an important cash crop in Alberta, Canada, and has high sulphur requirements at any growth stage. A shortage of sulphur can cause serious reductions in crop yield and quality.

Manufacturing processes for sulphur-containing fertilizers of the ammonium phosphate type often involve the use or incorporation of sulphates, see e.g. U.S. Pat. No. 4,377,406, or U.S. Pat. No. 4,762,546. A disadvantage of sulphates is that they are very mobile in the soil and easily leach out of the root zone, effectively making the sulphate nutrient unavailable to the plants.

Elemental sulphur is not leached out of the soil, as sulphates are. Instead, micron sized elemental sulphur particles are oxidized to sulphate sulphur, which is the form utilized by the plants, by soil bacteria during the cropping season. Elemental sulphur is, thus, considered a slow release form of plant nutrient sulphur that is less prone to leaching out of the crops root zone. It is, therefore, advantageous to have a large proportion of the sulphur in fertilizers present as elemental sulphur. Furthermore, elemental sulphur offers some additional benefits in agriculture, including acting as a fungicide against certain micro organisms, acting as a pesticide against certain soil and plant pests, assisting the decomposition of plant residues and improving phosphorus and nitrogen nutrient utilization and reducing the pH of alkaline and calcareous soils.

Thus, it is advantageous to incorporate sulphur in sulphur-containing fertilizers as elemental sulphur present as small particles.

Processes for the manufacture of sulphur-containing fertilizers, wherein elemental sulphur is used, are known in the art. Most of the methods involve the incorporation of molten sulphur into the fertilizer.

In U.S. Pat. No. 5,653,782, a process for the manufacture of sulphur-containing fertilizers has been described, wherein a substrate containing fertilizer particles is heated to a temperature above the melting point of sulphur and admixed with sulphur. According to U.S. Pat. No. 5,653,782, the sulphur is melted by the heat provided by the preheated fertilizer particles, thereby producing a homogeneous coating on the fertilizer particles.

U.S. Pat. No. 3,333,939, describes the coating of ammonium phosphate granules with molten sulphur. The granules are coated in a separate coating unit into which the sulphur is fed, by contacting the granules with molten sulphur or with a solution of ammonium polysulphide. Subsequently, the coated granules are dried.

Alternatively, U.S. Pat. No. 3,333,939 teaches a process for preparing sulphur-containing fertilizer particles in which the sulphur is interspersed throughout the particles. In this process ammonia and phosphoric acid are allowed to react to form ammonium phosphate. The ammonium phosphate formed is fed into a granulator in which it is mixed with urea and dry sulphur. The granules obtained are dried in a dryer.

The disadvantage of the first process of U.S. Pat. No. 3,333,939 is that the coating prevents a uniform distribution of ammonium sulphate and sulphur into the soil. The second process has the disadvantage that it requires solid sulphur handling. The handling and grinding of solid elemental sulphur is highly hazardous due to the generation of sulphur dust and risks of sulphur dust fires and explosions. As mentioned in a review by H. P. Rothbaum et al (New Zealand Journal of Science, 1980, vol. 23, 377), explosion hazards are always due to sulphur dust which is inflammable. Therefore, a complex process design is necessary to ensure the safety of the process.

U.S. Pat. No. 5,571,303 discloses a process for the manufacture of fertilizers in which first ammonia, water and phosphoric acid are reacted to form ammonium phosphate. Subsequently, the ammonium phosphate/water mixture is mixed with molten sulphur. The mixture thus obtained is kept at temperatures of 120-150° C. until granulation. A disadvantage of this process is safety, that is elevated sulphur concentrations in process dusts may lead to potentially explosive dust-air mixtures.

EP 1560801 A1 discloses a process for the manufacture of sulphur-containing ammonium phosphate fertilizers comprising combining elemental sulphur, in the liquid form, with ammonia, phosphoric acid and water.

Several prior art documents, e.g. GB 1312314, US 2002/0139158, WO 97/16396, WO 02/090295, U.S. Pat. No. 5,423,897 and U.S. Pat. No. 3,926,841 have disclosed the use of coating agents, incorporating surfactants, in the reduction of dust formation and caking during use and handling of NPK-type fertilizers.

WO 2008/024007 discloses a sulphur fertilizer, either in the form of globular granules or pellets that constitutes solidified mixtures of liquid sulphur and bentonite, and favourable additional components and fertilizing microelements, that is characterised by its content of 60 to 95% of sulphur, 4 to 20% bentonite and 1 to 8% lignosulphonate. The lignosulphonate is incorporated into the sulphur fertilizer molecules in order to allow the formation of granules or pellets which disperse easily in contact with soil moisture into sulphur molecules of much smaller size than known fertilizers of this type.

GB 2292140 also discloses sulphur/bentonite fertilizer compositions in which 1 to 30 wt. % of a binding material, such as a lignosulphonate, may be added in order to form suitable granules for application of sulphur to the land.

US 2004/0009878 describes particles containing a nitrogen-containing fertilizer composition, preferably based on urea, in which a binder component, such as a lignosulphonate, is present such that contact of the particles with water causes particle dispersion into more than 100 pieces.

WO 90/03350 discloses a sulphur-based chemical soil-corrective in the form of pellets for agricultural use, said product comprising fly sulphur powder, at least 3 wt. % of an inert product selected from the group consisting of clay, bentonite, kaolin and mixtures thereof, and at least 0.5 wt. % of a wetting agent, said components being mixed with one another and subjected to wet extrusion and subsequent drying to obtain said pellets. The wetting agent may be a lignin sulfonate. However, as WO 90/03350 relates to the handling of sulphur powder which is subjected to extrusion (rather than granulation as used according to the present invention) the teachings therein are not relevant for the process according to the invention.

Regardless of the improvements disclosed in the art, problems with the manufacture of phosphate-based fertilizers containing elemental sulphur, continue to be in existence. In particular, dust and explosion hazards involving elemental sulphur dust continue to be of great concern. Therefore, there remains a need for fertilizers and manufacturing processes for such fertilizers which would diminish or even prevent the safety problems experienced in the art.

SUMMARY OF THE INVENTION

According to the present invention, there is provided a process for the manufacture of sulphur-containing fertilizer compositions, said process comprising the steps of:
a) providing a slurry of at least one phosphate-based fertilizer material selected from the group consisting of ammonium phosphates, ammonium phosphate based nitrogen-phosphorus-potassium (NPK) compounds, super phosphates and partially acidulated phosphate rocks;
b) bringing said slurry into contact with at least one anionic surfactant and (preferably a liquid phase of) elemental sulphur; and
c) introducing the mixture obtained in step b) into a granulator unit in order to obtain granules of the fertilizer composition, wherein the at least one phosphate-based fertilizer material is present in an amount of at least 50 wt. % (preferably in the range of from 50 to 99 wt. %), the elemental sulfur is present in an amount in the range of from 1 to 25 wt. % and the at least one anionic surfactant is present in an amount in the range of from 0.001 to 3 wt. % based on the overall weight of the fertilizer composition.

The present invention also provides a fertilizer composition comprising:
a) elemental sulphur in an amount in the range of from 1 to 25 wt. %, based on the overall weight of the fertilizer composition;
b) at least one phosphate-based fertilizer material selected from the group consisting of ammonium phosphates, ammonium phosphate based nitrogen-phosphorus-potassium (NPK) compounds, super phosphates and partially acidulated phosphate rocks present in an amount of at least 50 wt. % (preferably in the range of from 50 to 99 wt. %), based on the overall weight of the fertilizer composition; and
c) at least one anionic surfactant present in an amount in the range of from 0.001 to 3 wt. % based on the overall weight of the fertilizer composition,
wherein the at least one anionic surfactant is dispersed throughout the fertilizer composition.

BRIEF DESCRIPTION OF THE DRAWINGS

FIG. 1 is a graph demonstrating the elemental sulphur (ES) ratios between the dryer cyclone underflow and the products of Examples 1 to 4.

FIG. 2 is a graph illustrating the total sulfur ratio between the cyclone overflows and the product for a range of concentrations of calcium lignosulphonate surfactant.

FIG. 3 illustrates the elemental sulfur ratio between the cyclone underflows and the product for a range of concentrations of calcium lignosulphonate surfactant.

FIG. 4 illustrates the elemental sulphur ratio between the dryer cyclone underflows and different anionic surfactant species as described in the Examples 2, 4, and 6-9.

DETAILED DESCRIPTION OF THE INVENTION

It has now surprisingly been found that a reduction in elemental sulphur concentration in dusts generated during manufacturing and handling of sulphur-containing fertilizers, and its associated hazards (e.g. respiratory and dust explosion risks) can be achieved during the production of sulphur-containing phosphate-based fertilizers, if at least one anionic surfactant is added and dispersed throughout the fertilizer composition during production.

The elemental sulphur used in the fertilizer composition and process of the present invention can be obtained from any suitable source. In one embodiment of the present invention, the elemental sulphur is obtained from an industrial process, such as the removal of unwanted sulphur components from natural gas.

The elemental sulphur used may be high purity (>99.9% S) chemical sulphur as obtained from the Claus process. However, the process of the present invention can use elemental sulphur of significantly less purity than this. Examples of such elemental sulphur containing materials are sulphur filter cake as obtained from sulphur melting and filtration operations and sulphur obtained from a various chemical and biological $H_2S$ gas removal processes. Typically, such sulphur sources may contain anywhere in the range of from 30 to 99.9 wt. %, preferably from 50 to 99.5 wt. %, more preferably from 60 to 99.0 wt. %, sulphur.

In the present invention, the elemental sulphur is present in the fertilizer composition in an amount in the range of from 1 wt. % to 25 wt. %, based on the total weight of the fertilizer composition. Preferably, the elemental sulfur is present in an amount in the range of from 2 to 18 wt. %, more preferably in the range of from 5 to 15 wt. %, based on the total weight of the fertilizer composition. The most homogeneous distribution of sulphur in and throughout the granules is achieved when the content of elemental sulphur is in the range of from 5 to 15 wt. %, based on the weight of the total fertilizer composition.

The phosphate-based fertilizer material used in the composition and process of the present invention is selected from the group consisting of ammonium phosphates, ammonium phosphate based nitrogen-phosphorus-potassium (NPK) compounds, super phosphates and partially acidulated phosphate rocks. Examples of suitable ammonium phosphates are mono-ammonium phosphates and di-ammonium phosphates. Suitable super phosphates, include, but are not limited to, normal superphosphates and triple superphosphates.

It will be apparent to the skilled person that the choice of phosphate-based fertilizer material will depend on the end use of the fertilizer composition.

In a preferred embodiment of the present invention, the at least one phosphate-based fertilizer material comprises at least one ammonium phosphate.

At least one anionic surfactant is required by the present invention. Suitable anionic surfactants include, but are not limited to, lignin derivatives such as lignosulphonates, aromatic sulphonates and aliphatic sulphonates and their formaldehyde condensates and derivatives, fatty acids/carboxylates, sulphonated fatty acids and phosphate esters of alkylphenol-, polyalkyleryl- or alkyl-alkoxylates.

Lignosulphonates are known and are defined, for example, in Römpp Chemielexikon [Dictionary of Chemistry], 9th Edition, Volume 3, Georg-Thieme Verlag, Stuttgart, N.Y.

1990, page 2511. Particularly suitable lignosulphonates are the alkali metal salts and/or alkaline earth metal salts and/or ammonium salts, for example the ammonium, sodium, potassium, calcium or magnesium salts of lignosulphonic acid. The sodium, potassium or calcium salts are preferably used, and the sodium and/or calcium salts are very particularly preferably used.

Naturally, the term lignosulphonates also encompasses mixed salts of different ions such as potassium/sodium lignosulphonate, potassium/calcium lignosulphonate or the like, in particular sodium/calcium lignosulphonate.

Preferred aromatic sulphonates are alkylnaphthalene sulphonates and condensates thereof; preferably the alkyl group contains 1 to 10 carbon atoms. Typical counter-ions are: proton, sodium, potassium, calcium, isopropyl ammonium, ammonium, alkanolamine etc. Exemplary alkylnaphthalene sulfonates include metal salts and organic salts of alkylnaphthalene sulfonates such as sodium diisopropylnaphthalene sulfonate, butylnaphthalene sodium sulfonate, nonylnaphthalene sodium sulfonate, sodium dibutylnaphthalene sulfonate and sodium dimethylnaphthalene sulfonate.

Also, alkylbenzene sulphonates are preferred, in particular wherein the alkyl contains 1 to 12 carbon atoms.

The anionic surfactant is present in an amount in the range of from 0.001 to 3 wt. % based on the overall weight of the fertilizer composition. Preferably, the at least one anionic surfactant is present in an amount of at least 0.01 wt. %, preferably at least 0.05 wt. %, more preferably at least 0.08 wt. %, even more preferably at least 0.1 wt. %, most preferably at least 0.15 wt. % with respect to the weight of the overall fertilizer composition. Preferably, the at least one anionic surfactant is present in an amount of at most 2 wt. %, more preferably at most 1 wt. %, even more preferably at most 0.9 wt. %, most preferably at most 0.5 wt. %, with respect to the weight of the overall fertilizer composition.

Other ingredients may be incorporated into the fertilizer composition of the present invention, in order to tailor the fertilizer composition to its intended end-use. Examples include plant micronutrients such as boron, selenium, sodium, zinc, manganese, iron, copper, molybdenum, cobalt, calcium, magnesium and combinations thereof. These nutrients may be supplied in elemental form or in the form of salts, for examples as sulphates, nitrates, oxides or halides. In this way, granules enriched in plant nutrients are obtained. The amount of plant micronutrients depends on the type of fertilizer needed and is typically in the range of from 0.1 to 5 wt. %, based on the total weight of the granules.

In the process of the present invention, the slurry of at least one phosphate-based fertilizer material is typically a slurry in water. This may be formed by the mixing of the required phosphate-based fertilizer material or materials and water or may be formed by the in-situ production of the phosphate-based fertilizer material in an aqueous medium.

An example of the latter is the production of an ammonium phosphate or other phosphate-base NPK compound by reacting ammonia, phosphoric acid and water in a reactor unit. In such an embodiment of the present invention, the phosphoric acid is typically manufactured by reacting sulphuric acid with phosphate rock or is commercially available phosphoric acid. To avoid the introduction of excess process water, the ammonia may be introduced as a concentrated aqueous solution or as anhydrous gaseous or liquid ammonia, preferably as anhydrous ammonia. The advantage of having a mixture with as little water as possible is that any additional water introduced into a fertilizer process must be handled in the process and eliminated at a later stage. Preferably, the water content in the ammonium phosphate mixture is kept as low as possible, preferably in the range of from 10 to 20 wt. % based on the total weight of the mixture, more preferably in the range of from 12 to 15 wt. % based on the total weight of the mixture.

The amounts of ammonia and phosphoric acid are adjusted to achieve a pumpable slurry suitable for granulation and the final desired product grade. For the production of sulphur-containing monoammonium phosphate (S-MAP), the molar ratio of nitrogen to phosphorous is typically kept between values in the range of from 0.4 to 0.7 when using a 'forward titration' mode and in the range of from 1.2 to 1.5 when using a 'back titration' mode. In both cases the final nitrogen-to-phosphorous molar ratio is adjusted to 1. For the production of sulphur-containing di-ammonium phosphate (S-DAP) the molar ratio of nitrogen to phosphorous is typically kept in the range of from 1.2 to 1.5, adjusted to a value in the range of from 1.8 to 2.0 for the final product.

Typically, the reaction takes place at atmospheric pressure and at temperatures in the range of from 100° C. to 150° C. Preferably, water or sulphuric acid is added to the reactor unit to control the temperature of the mixture. Typically, water may be added when a temperature reduction is needed and sulphuric acid may be added to when a temperature increase is needed and/or when some sulphate sulphur is desirable in the final fertilizer composition.

In one embodiment of the present invention, the liquid phase comprising sulphur comprises a slurry of sulphur particles in an aqueous medium (such as water, ammonium phosphate solution, phosphoric acid, ammonium sulphate or a combination thereof). In this embodiment, typically, the sulphur particles are dispersed or suspended in the slurry. Preferably, the sulphur particles have a size of at least 0.5 microns, preferably at least 5.0 microns, more preferably at least 10 microns, even more preferably at least 30 microns. Preferably, the sulphur particles have a size of at most 250 microns, preferably at most 200 microns, more preferably at most 150 microns, most preferably at most 100 microns. To avoid the removal of excess water at a later stage in the process, the water content in the sulphur slurry is typically kept as low as possible, preferably in the range of from 10 to 40 wt. % based on the total weight of the mixture, more preferably in the range of from 15 to 30 wt. % based on the total weight of the slurry. In the case where the sulphur particles are suspended in the slurry, the sulphur slurry is preferably stirred or mixed in a suitable apparatus (e.g. a high shear milling device) to homogenise the slurry prior to introducing it into the manufacturing process.

In this embodiment, is preferred that the sulphur slurry contains sulphur particles which are dispersed in the aqueous medium (such as water and the like). This type of slurry, henceforth referred to as dispersed or emulsified sulphur slurry, comprises dispersed sulphur particles in an aqueous medium, preferably dispersed micron-sized sulphur particles in the aqueous medium. The sulphur particles are suitably kept in dispersion through the addition of a suitable emulsifier and/or viscosity modifier to obtain a pumpable slurry. Suitable emulsifiers and viscosity modifiers are known in the art and are not critical to the invention. An advantage of using dispersed sulphur particles is that the settling of sulphur particles is kept to a minimum and the sulphur is distributed more homogeneously throughout the aqueous medium. Thus, the need for stirring or mixing prior to introducing the sulphur slurry into the reactor unit is reduced. Typically, the slurry is introduced by pumping the slurry from a sulphur slurry reservoir unit into a reactor unit.

In a preferred embodiment of the present invention, liquid phase comprising sulphur comprises molten sulphur. Molten sulphur can be obtained from solid sulphur, by melting in a suitable melting apparatus, for instance a tube melter.

The use of molten sulphur is advantageous when sulphur is obtained in the molten state from an industrial process. Processes for the removal of unwanted sulphur components from natural gas usually produce sulphur in the molten state and the use of this molten sulphur directly in the fertilizer manufacturing process according to the invention avoids the need for additional steps, such as forming and grinding of the sulphur, to obtain a sulphur slurry. An additional advantage of using molten sulphur is that no additional water is introduced into the fertilizer manufacturing process. When adding elemental sulphur in the molten state, the temperature of the sulphur-containing mixture is preferably kept above the melting point of sulphur, preferably at temperatures in the range of from 115° C. to 150° C. In a typical process, the molten sulphur is added into a reactor at this temperature, before the reaction mixture is introduced into a granulator.

The at least one anionic surfactant may be provided in any form suitable for mixing with the sulphur in a liquid phase and/or the slurry of at least one phosphate-based fertilizer material.

The at least one anionic surfactant may be added to the sulphur in a liquid phase, before it is brought into contact with the at least one phosphate-based fertilizer material. Alternatively, the at least one anionic surfactant may be added directly to the slurry of at least one phosphate-based fertilizer material before or after it is brought into contact with the sulphur or may be added directly to the granulator.

In a preferred embodiment of the present invention the at least one anionic surfactant is added as a liquid directly to the slurry of at least one phosphate-based fertilizer material.

Reference herein to a granulator is to a device for forming granules or pellets of fertilizer product. Commonly used granulators are described in Perry's Chemical Engineers' Handbook, chapter 20 (1997). Preferred granulators are rotary drum granulators or pan granulators. Typically, the mixture is pumped and distributed on a rolling bed of material in a rotary drum granulator. In the granulator, granules are formed.

The sulphur in the sulphur-containing fertilizer compositions according to the invention may be incorporated into granules comprising the at least one phosphate-based fertilizer material, or the sulphur may be distributed on the granules or the sulphur may be both incorporated into the granules and be distributed on the granules.

Reference herein to granules is to discrete particles. These particles comprise the at least one phosphate-based fertilizer material, the at least one anionic surfactant and elemental sulphur.

The at least one anionic surfactant is dispersed throughout the fertilizer composition. That is, the at least one anionic surfactant is incorporated throughout the granules and does not exist merely in a surface layer.

Optionally, water and steam can also be fed to the granulator to control the temperature of the granulation process as needed.

Additional ammonia and/or recycled fertilizer particles may be added to the granulator unit. Recycled fertilizer particles add granulation and nucleating agents. They are obtained from the final fertilizer product. Suitably they have small particle sizes (so-called off-spec fines). The recycle of fines is also described in U.S. Pat. No. 3,333,939.

The granules of the sulphur-containing fertilizer compositions obtained after the granulation step are optionally dried in a drying unit. In a preferred embodiment, the granules are air-dried in the drying unit, thereby avoiding the need for additional drying equipment. Alternatively, drying units wherein heat transfer for drying is accomplished by direct contact between the wet solid and hot gases are used, thereby enabling a faster drying step. Typically, the drying unit is a rotary dryer.

In a preferred process according to the invention, the granules are sorted on their size in a sorting (screening) unit to achieve a more uniform size distribution. Typically, oversized granules are crushed to less than 1 mm and along with undersized granules are returned to the granulator as so-called recycle material (or "off-spec fines"). A preferred size range for the granules is in the range of from 1.5 to 5.0 mm, more preferably in the range of from 2 to 4 mm, expressed as the average diameter of the granules. The use of granules which fall within this range is more likely to enable a more even distribution of the fertilizer ingredients in the soil after applying the granules to the soil.

It will be appreciated that the process parameters in the reactor unit and in the granulator unit have to be adjusted depending on the desired products.

After a typical manufacturing process according to the invention, sulphur-containing fertilizer compositions, optionally enriched in plant nutrients, are obtained.

EXAMPLES

The following non-limiting Examples will illustrate the invention. Example 1 and 2 are not according to the present invention (no use of a surfactant), whilst Examples 3-9 are according to the present invention. The Examples were carried out as follows:

Examples 1 and 2

Not According to the Present Invention

During each example, phosphoric acid was fed into a preneutralizer (PN). Ammonia was then introduced into the PN. Molten elemental sulphur (ES) was prepared in a separate tank and was allowed to overflow into the top of the PN by gravity through an overflow line. The average molten sulphur temperature maintained throughout the test program was approximately 135° C.

The resultant ammonium phosphate/ES slurry was then transferred from the PN to a drum granulator. Gaseous ammonia was fed to the granulator via a sparger submerged under the rolling bed of material in the granulator. Recycle material was also fed to the granulator. The recycle material consisted of the undersize fraction from the screens and crushed oversize fractions. When necessary, to control granulation, product-size material was diverted back to the granulator.

Moist, granular material from the granulator was discharged into a rotary dryer operating at a rotational speed of 7 rpm. A cyclone-type dust collector was located in the process air duct between the dryer discharge and the exhaust fan.

The material was transferred from the dryer to a mechanically vibrated screen system in order to produce product material between 2.36 mm and 4.00 mm. Oversize material from the screen system was routed to a chain mill. The crushed material discharging from the chain mill was returned to the screen system. Undersize material from the screen system was returned to the granulator together with a controlled fraction of the product size material to maintain optimum granulation. The product-size fraction from the screen system was fed to a rotary cooler.

The apparatus was also fitted with a fugitive dust system in order to collect dust samples. The dryer cyclone and fugitive dust cyclone inlets were sampled twice for periods of 4 hours each. The samples were analysed in order to determine the sulphur content in the dust collected.

The airstream samples were analyzed for total sulphur (TS) and sulphate sulphur ($SO_4^+$—S) content. The ES values were obtained by subtracting the sulphate sulphur ($SO_4^+$—S) values from the total sulphur (TS) values.

Examples 3 and 4

These examples were carried out according to the method of Examples 1 and 2, above, except that calcium lignosulphonate was added (as an anionic surfactant) directly to the PN slurry using a peristaltic pump to achieve a desired concentration of 0.2 wt. % in the final product.

FIG. 1 demonstrates the elemental sulphur (ES) ratios between the dryer cyclone underflow and the products of Examples 1 to 4.

Examples 5 and 6

The process of Examples 3 and 4 was repeated except that calcium lignosulphonate was added directly to the PN slurry using a peristaltic pump to achieve the desired concentrations shown in FIGS. 2 and 3 in the final product.

FIG. 2 illustrates the total sulfur ratio between the cyclone overflows and the product for a range of concentrations of calcium lignosulphonate surfactant as used in Examples 2 (0 wt. %), 4 (0.2 wt. %), 5 (0.5 wt. %) and 6 (0.65 wt. %), both for the dryer (Series 1) and the fugitive dust (Series 2) cyclone overflows. Total sulphur refers to the sum of elemental sulphur and sulphate sulphur.

FIG. 3 illustrates the elemental sulfur ratio between the cyclone underflows and the product for a range of concentrations of calcium lignosulphonate surfactant (again as used in Examples 2 and 4-6), both for the dryer (Series 1) and the fugitive dust (Series 2) cyclone underflows.

Example 7

The process of Examples 1 and 2 was repeated except that Marasperse CBoS-4 (an anionic surfactant based on sodium lignosulphate, available from LignoTech USA, Inc. (Rothschild, Wis., USA)) was added by means of a screw-feeder into a portion of the scrubber water. The resulting solution was fed into the PN slurry to achieve a concentration of 0.15 wt. % of Marasperse CBoS-4, based on the overall weight of the fertilizer composition.

Example 8

The process of Examples 1 and 2 was repeated except that Marasperse AG (an anionic surfactant based on sodium lignosulphate, available from LignoTech USA, Inc. (Rothschild, Wis., USA)) was added by means of a screw-feeder into a portion of the scrubber water. The resulting solution was fed into the PN slurry to achieve a concentration of 0.15 wt. % of Marasperse AG, based on the overall weight of the fertilizer composition.

Example 9

The process of Examples 3 and 4 was repeated except that Morwet D-425 (an anionic surfactant based on alkylnaphthalene sulfonate condensate, available from AkzoNobel Surface Chemistry AB (Stenungsund, Sweden)) was added directly to the PN slurry using a peristaltic pump to achieve a concentration of 0.063 wt. % of Morwet D-425, based on the overall weight of the fertilizer composition.

FIG. 4 illustrates the elemental sulphur ratio between the dryer cyclone underflows and the product for Examples 2, 4, and 6-9.

DISCUSSION

As can be learned from FIG. 1, the elemental sulphur ratios between the cyclone underflows and the fertilizer composition product is significantly lower for Examples 3 and 4 according to the present invention (containing a surfactant) when compared with Examples 1 and 2. Thus, the concentration of elemental sulphur in the process dusts generated in the processes of Example 3 and 4 are significantly lower, resulting in reduced sulphur dust and explosion hazards.

From FIGS. 2 and 3 it can be learned that it is preferred according to the present invention that the anionic surfactant is present in an amount of at least 0.05 wt. %, preferably at least 0.1 wt. %, more preferably at least 0.2 wt. %.

FIG. 4 shows the elemental sulphur ratios for the dryer cyclone underflows for Examples 2 (not according to the present invention), 4 and 6-9. From FIG. 4 it can be learned that the effect of the present invention can be achieved with various anionic surfactant chemistries.

What is claimed is:

1. A process for the manufacture of sulphur-containing fertilizer compositions, said process comprising the steps of:
   a) providing a slurry of at least one phosphate-based fertilizer material selected from the group consisting of ammonium phosphates, ammonium phosphate based nitrogen-phosphorus-potassium (NPK) compounds, super phosphates and partially acidulated phosphate rocks;
   b) bringing said slurry into contact with at least one anionic surfactant and a liquid phase of elemental sulphur; and
   c) introducing the mixture obtained in step b) into a granulator unit in order to obtain granules of the fertilizer composition, wherein the at least one phosphate-based fertilizer material is present in an amount in the range of at least 50 wt. %, the elemental sulfur is present in an amount in the range of from 1 to 25 wt. % and the at least one anionic surfactant is present in an amount in the range of from 0.001 to 3 wt. % based on the overall weight of the fertilizer composition.

2. A process as claimed in claim 1, wherein elemental sulphur comprises molten sulphur.

3. A process as claimed in claim 1, wherein the at least one anionic surfactant comprises a lignosulphonate.

4. A process as claimed in claim 1, wherein the at least one anionic surfactant is present in an amount in the range of from 0.05 to 3 wt. % with respect to the weight of the overall fertilizer composition.

5. A process as claimed in claim 1, wherein the at least one anionic surfactant is present in an amount in the range of from 0.1 to 2.0 wt. %, with respect to the weight of the overall fertilizer composition.

6. A fertilizer composition comprising:
   a) elemental sulphur in an amount in the range of from 1 to 25 wt. %, based on the overall weight of the fertilizer composition;
   b) at least one phosphate-based fertilizer material selected from the group consisting of ammonium phosphates, ammonium phosphate based nitrogen-phosphorus-potassium (NPK) compounds, super phosphates and partially acidulated phosphate rocks present in an amount of at least 50 wt. %, based on the overall weight of the fertilizer composition; and c) at least one anionic surfactant present in an amount in the range of from 0.001 to 3 wt. % based on the overall weight of the fertilizer composition, wherein the at least one anionic surfactant is dispersed throughout the fertilizer composition.

7. A fertilizer composition as claimed in claim 6, wherein the at least one anionic surfactant comprises a lignosulphonate.

8. A fertilizer composition as claimed in claim 7, wherein the at least one anionic surfactant comprises a lignosulphonate selected from the group consisting of alkali metal salts of lignosulphonic acid, alkaline earth metal salts of lignosulphonic acid and ammonium salts of lignosulphonic acid.

9. A fertilizer composition as claimed in claim 6, wherein the at least one anionic surfactant is present in an amount in the range of from 0.05 to 3 wt. % with respect to the weight of the overall fertilizer composition.

10. A fertilizer composition as claimed in claim 6, wherein the at least one anionic surfactant is present in an amount in the range of from 0.1 to 2.0 wt. %, with respect to the weight of the overall fertilizer composition.

* * * * *